Feb. 25, 1969
R. W. SPIEGEL ET AL
3,429,444
CONE FILTER FOR AN AUTOMATIC WASHER
Filed Oct. 31, 1966
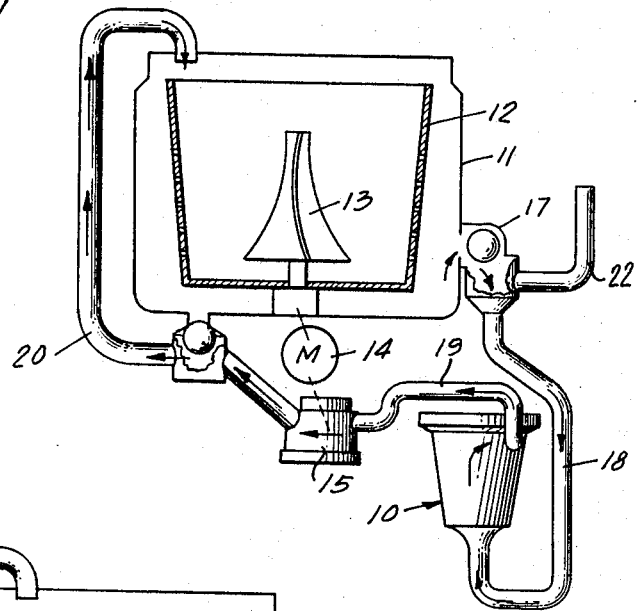
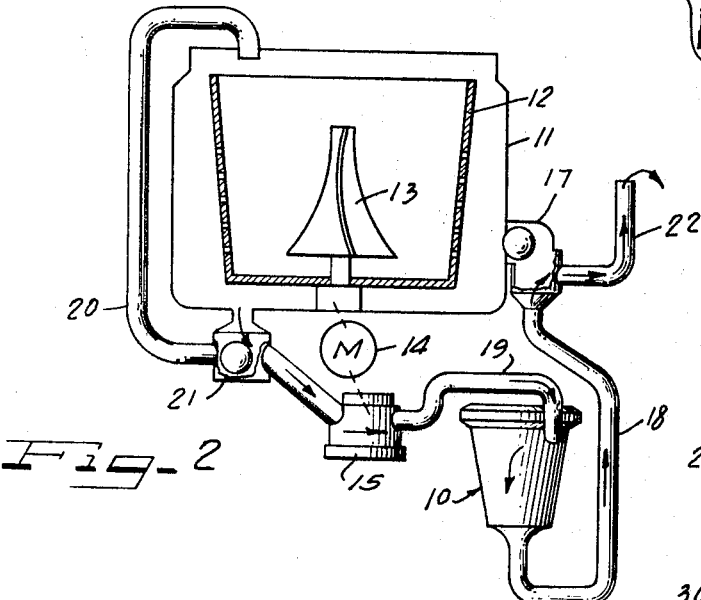
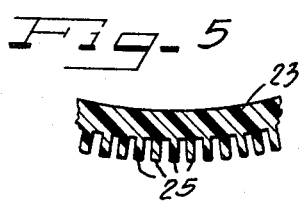
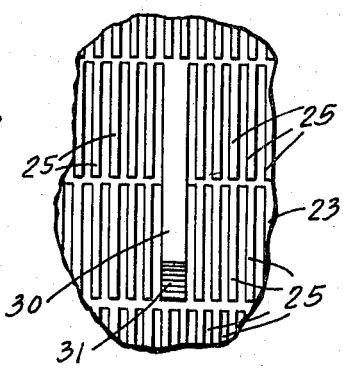
INVENTORS
RAYMOND W. SPIEGEL
WILLIAM F. ROBANDT
CLARK I. PLATT
BY *Klee, Sherman, ...*
ATTORNEYS

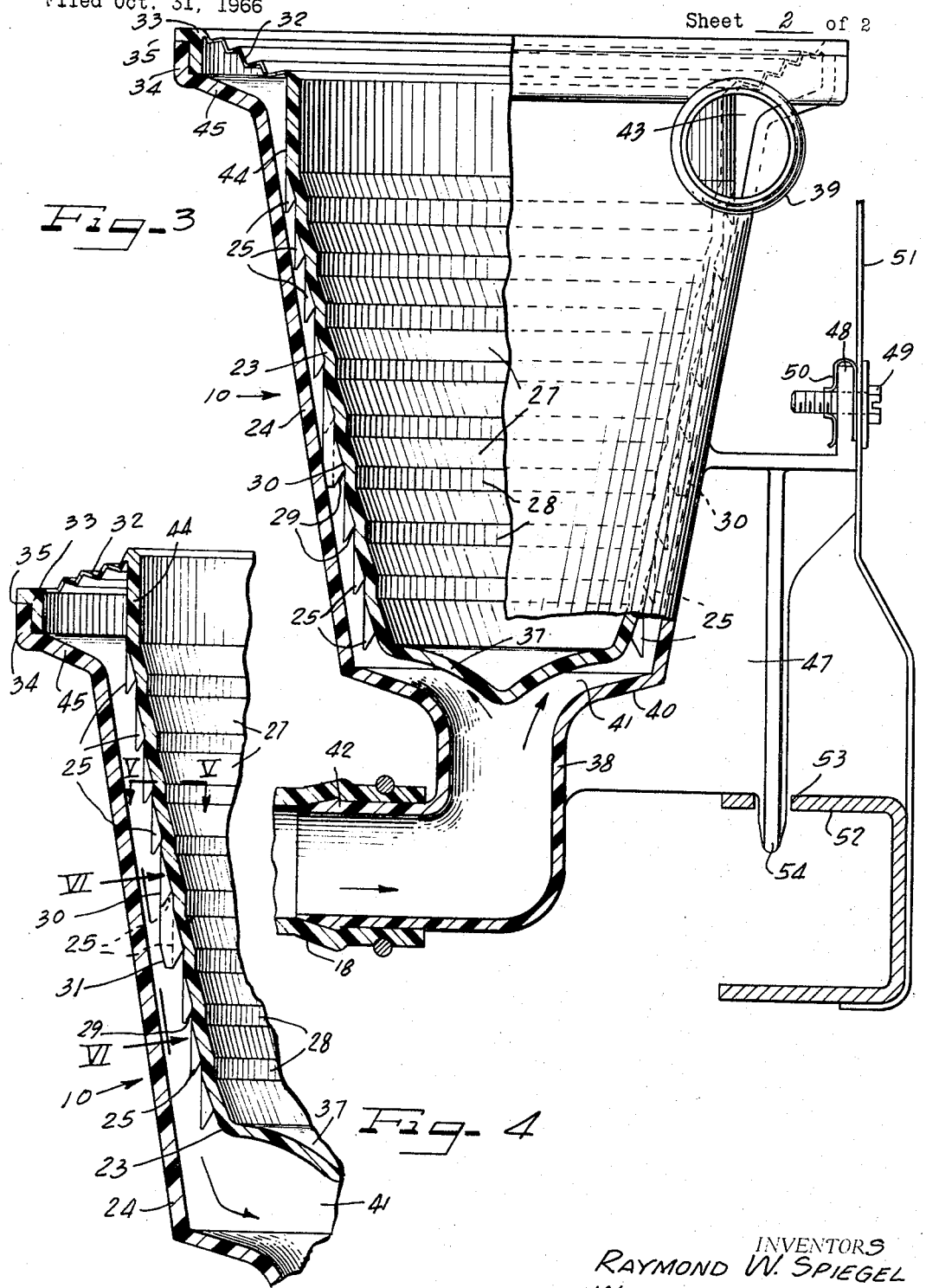

United States Patent Office 3,429,444
Patented Feb. 25, 1969

3,429,444
CONE FILTER FOR AN AUTOMATIC WASHER
Raymond W. Spiegel, Ann Arbor, William F. Robandt, St. Joseph, and Clark I. Platt, Benton Harbor, Mich., assignors to Whirlpool Corporation, Benton Harbor, Mich., a corporation of Delaware
Filed Oct. 31, 1966, Ser. No. 590,961
U.S. Cl. 210—356   19 Claims
Int. Cl. B01d 35/02

ABSTRACT OF THE DISCLOSURE

A filter or trap especially adapted for removing lint from wash water in automatic domestic washing machines having wash and drain cycles, comprises a self-contained unit with two internested parts interconnected by a diaphragm or flexible portion, with integral teeth on one of the parts providing filter means in a flow path between the parts. The unit is pressure responsive for effecting a close relationship of the parts and narrow flow path for filtering and efficient self-cleaning accompanied by expanding the parts and widening the path.

---

This invention relates generally to filtering apparatus, and more particularly to a self-cleaning expansible unit especially adapted for use with automatic domestic washing machines having wash and drain cycles.

Filtering of lint from wash water in the washing machine has presented a continuing problem. Various filtering and lint trapping arrangements have heretofore been proposed, but they have been subject to various disadvantages and deficiencies, among which may be mentioned liability to clogging, uneven separation of lint from the wash water, necessity for manual cleanout, limited capacity and the like.

It is therefore an important object of the present invention to provide a new lint filter or trap which is free from and overcomes deficiencies of prior devices, is simple and rugged in construction, of low cost, and highly efficient for the intended purpose.

Another object of the invention is to provide a new lint filter which is unusually efficient in substantially uniformly removing lint from wash water of washing machines with high efficiency and operating at high capacity.

A further object of the invention is to provide a new lint filter which automatically flushes during a drainage cycle of the associated washing machine.

Still another object of the invention is to provide a new lint filter having novel lint trapping structure of large capacity and uniformity in operation.

A still further object of the invention is to provide a novel lint filter comprising a pair of cooperating members which are adapted to be constructed as molded copolymer plastic parts and arranged to be assembled as a permanently sealed unit.

Other objects, features and advantages of the present invention will be readily apparent from the following detailed description of a preferred embodiment thereof taken in conjunction with the accompanying drawings, in which:

FIGURE 1 is a schematic view of an automatic clothes washing machine showing the flow circuitry associated therewith including a lint filter embodying features of the invention, the direction of flow being indicated as during the wash cycle;

FIGURE 2 is a similar schematic view showing the direction of flow during a drain cycle;

FIGURE 3 is an enlarged vertical sectional and partially elevational view of the lint filter;

FIGURE 4 is a fragmentary vertical sectional view showing the parts during a drain and filter flushing cycle;

FIGURE 5 is a fragmentary enlarged sectional detail view taken substantially on the line V—V of FIG. 4; and FIGURE 6 is a fragmentary enlarged elevational detail view taken substantially on line VI—VI of FIG. 4.

Illustrative of a domestic clothes washing machine system in which a lint filter or trap 10 embodying features of the invention is adapted to be used, FIGURE 1 depicts a tub 11 having mounted therein a spin dry basket 12 and an agitator 13 operatively connected to a driving motor 14. Also driven by the motor 14 is a reversible circulating pump 15. Wash water is supplied to the tub 11 in any suitable manner and by any suitable means, not shown.

At any desirable time in the wash cycle, or continuously during such wash cycle, the wash water is circulated by action of the pump 15 as indicated by directional flow arrows in FIGURE 1. During such flow, the water leaves the lower portion of the tub 11 through a check valve 17 and passes by way of a duct 18 into the lower end of the filter unit 10. Substantially lint-free water passes from the filter 10 through a duct 19 to the pump 15, whence it is conducted through a return duct 20 to the tub 11.

At conclusion of the wash cycle, the laundry machine is operated in a drain and spin dry cycle, during which the pump 15 is reversed, whereby a check valve 21 effects communication between the bottom of the tub 11 with the delivery duct 20 adjacent the pump 15, the reverse action of which operates to drain the tub, as indicated by directional flow arrows in FIGURE 2, and sends the drain water through the duct 19 into the upper portion of the filter 10, acting automatically to flush lint from the filter. Thence the drain water and flushed lint pass on through the duct 18 and past the check valve 17 into a drain outlet 22.

According to the present invention, the lint filter 10 comprises a sealed, automatic flow responsive unit. To this end, it comprises simply two coactive members economically manufactured as copolymer (i.e., polypropylene), namely, a filter member 23 and a complementary coactive member 24. Both of the members 23 and 24 are desirably of generally frustoconical shape and comprise respective self-sustaining, substantially rigid shells, with the filter member 23 operatively nested within the coactive member 24 which serves as a housing for the filter unit.

On its generally frustoconical surface which confronts the inner surface of the member 24, the filter member 23 has a pattern of lint-capturing pointed teeth 25 oriented toward the direction from which lint-bearing wash water is circulated through the filter unit. These teeth are molded integrally with the body wall of the filter member 23 and are desirably of a generally triangular outline form in side elevation, are of thin cross section, and are correlated in respective progressive bands or annular rows about the filter member body from its lower end to substantially its upper end so as to afford a large number of progressive filter traps. In one practical example, there has been provided on the filter member body wall within an area about 4¼" long and tapering from a minimum diameter of about 2⅛" to a maximum diameter of about 3¾" a total of 1411 of the teeth 25 of .031" width spaced apart .031", with nine equally spaced rows of teeth having 120 teeth in the lowermost row and progressively increasing up the flaring wall of the filter member to 195 teeth in the uppermost row. This affords a large filtration capacity in a relatively compact area.

For molding draft convenience and to afford maximum lint collecting or trapping function of the teeth 25, each row of the teeth is carried on a respective tapered annular area 27 of the filter member wall and separated in a generally stepped configuration by a relatively narrow annular substantially cylindrical longitudinal spacer area 28. As best seen in FIGURES 3 and 4, the radially outer edges of the teeth 25 are aligned with the radially outer surfaces defining the spacer band areas 28 at the upper ends of the teeth, while the radially inner free edges of the teeth extending from the tip points of the teeth generally oppose the lower adjacent radially outer surfaces of the spacer bands 28 in spaced relation. This arrangement places the successive rows of the teeth 25 in efficient progressive lint-collecting relationship and provides effective deep lint-collecting notches 29 between the teeth and the lower adjacent spacer band areas 28.

Another feature affording efficiency in operation comprises a convergent relation of the confronting surfaces of the members 23 and 24 and a progressively closer approach of the filter teeth 25 to the straight frustoconical confronting inner surface of the member 24 from the lower end to the upper end of the toothed area of the filter member 23. This has the effect of substantially uniformly spreading the lint-collecting action of the teeth 25 throughout the filter area during the wash cycle and a substantially uniform cleansing of the teeth during the drain cycle. In the filtering relationship, the predetermined convergent spaced relation between the filter member 23 and the housing member 24 is maintained by an anular series of substantially spaced stop fins 30 integral with the filter member 23 and of substantially wider and longer dimensions than the teeth 25, such as on the order of twice as wide and twice as long. Desirably there are four of the stop fins 30 equally spaced about the perimeter of the filter member 23 and extending from and downwardly relative to the longitudinally center row of the teeth 25 and radially outwardly beyond the next adjacent lower row of teeth, with respective contact pads 31 on the radially outer sides of the lower end portions of the stop fins on a complementary angle to the contacted surface of the member 24.

Attachment of the filter member 23 and the housing member 24 to one another is advantageously effected through an annularly corrugated diaphragm flange or bellows 32 integral with the upper end of the filter member 23 and extending generally radially outwardly and integrally connected to a generally inverted L-shaped annular attachment flange 33 which is telescopically internested with an upstanding annular attachment terminal flange 34 on the upper end of the housing member 24. The joint between the flanges 33 and 34 is permanently secured in hermetically sealed relation as by spin weld securement 35. Through sealing of this single joint between the filter members a completely sealed, leak-proof unit is provided, since the filter member 23 has an integral lower end closure 37. The only openings into the sealed filter unit 10 are through a tubular inlet/outlet bottom nozzle 38 and a tubular inlet/outlet top nozzle 39 on the housing member 24.

It will be apparent that any flexible means of connection may be effected between filter member 23 and the housing member 24, so long as positive displacement of filter member 23 is permitted. Further, although the wider end of filter member 23 is shown as being open, it may be desirable to provide some cover means thereon. Then, a flexible connection may be made between that cover and the housing member 24.

Integral connection of the bottom nozzle 38 with the housing member is coaxially through a sloping annular bottom wall 40 which opposes the lower end closure 37 of the filter member 23 in spaced relation and defining therewith an annular chamber 41 leading to the frustoconical filtration area defined between the members 23 and 24. For smooth, substantially turbulence-free flow of water through the chamber 41, the closure wall 37 is desirably of symmetrical tapering downwardly protruding form as shown. For convenience in attaching the conduit tube 18 to the nozzle 38, an angular attachment nipple extension 42 is provided on this nozzle.

Location of the upper nozzle 39, to which the conduit 19 is coupled, is desirably on an axis substantially tangentially oriented with respect to an annular head chamber 43 defined between the diaphragm 32 and an upper generally cylindrical terminal portion 44 on the filter member 23 and an outwardly flaring annular head flange 45 on the housing 24 from which the upwardly extending attachment flange 34 projects.

For mounting the filter unit 10, it is desirably provided with an integral sidewardly extending mounting bracket 47 comprising an integral part of the housing member 24 and including an upwardly extending attachment flange 48 arranged to be secured by a screw 49 and a sheet metal nut 50 to a housing 51 forming part of the washing machine, with the bottom of the bracket resting on a frame member 52 having an aperture 53 therein receptive of a downwardly projecting stabilizing finger 54 on the bracket.

In operation, pumping suction through the nozzle 39 during the wash cycle acts in the chamber 43 by negative pressure on the bellows 32 to pull downwardly and thus maintain the filter member 23 in filtering relation to the coactive housing member 24 as shown in FIGURE 3. In this relationship the stop fins 30 engage the housing member and the filter teeth 25 are in their minimum spaced relation to the confronting wall of the housing member. Thereby wash water entering the filter through the nozzle 38 under the pumping suction must travel a restricted path upwardly about the filter member 23, such path progressively diminishing in width but increasing in diameter due to the generally conical arrangement of the filter members and the convergence of the body walls thereof. Thus, as the lint-carrying water enters through the nozzle 38 and is substantially uniformly distributed by the distributor wall 37 and through the annular chamber 41 to the restricted filter gap path between the filter unit members, the water progressively washes onto and through the successive bands of the filter teeth 25 which retain the lint so that relatively lint-free water passes on from the upper chamber 43 through the nozzle 39 and is returned to the washing machine tub.

During the drain cycle, water from the washing machine tub is pumped into the filter unit 10 through the top nozzle 39 which creates a pressure in the chamber 43 acting on the diaphragm 32 to function as a hinge to raise the filter member 23, as shown in FIGURE 4, thereby substantially separating and increasing the gap between the filter unit members. Just as the lint was substantially uniformly removed from the wash water, with a substantially uniform buildup of lint on and along the teeth 25, the reverse drain flow effects uniform cleaning of the teeth. Just as the greater spacing of the lower rows of teeth from the confronting wall of the housing member 24 avoids undesirable lint buildup therein which would tend to block off the remaining portion of the filter, in the reverse or flushing or cleaning operation, the progressively increased spacing of the teeth from the housing precludes lint clogging in the lower portion of the filter. Hence there is an efficient flushing the the lint through the substantially enlarged chamber 41 and out through the nozzle 38 and thence through the duct 18 to the drain.

It will thus be seen that the filter member 23 automatically assumes the filtering relation to the housing unit 24 responsive to the wash circulation cycle of operation, and that the filter member automatically assumes the lint flushing spaced relationship to the housing member 24 responsive to water pressure during the drain cycle of operation in the machine circuit.

The filter unit 10 comprises a fully self-contained, permanently sealed assembly which is leakproof. It is compact in size although of large capacity and is of quite light weight since it comprises simply a pair of molded relatively thin plastic shells. It is easy and convenient to install since all that is needed is to attach the ends of the appropriate ducts to the lower and upper nozzles of the unit. Since movement of the filter member 24 is primarily dependent upon differences in water pressure, the filter unit 10 may be installed in the inverted position if desired, or in virtually any position.

Although minor modifications might be suggested by those versed in the art, it should be understood that we wish to embody within the scope of the patent warranted hereon all such modifications as reasonably and properly come within the scope of our contribution to the art.

The embodiments of the invention in which an exlusive property or privilege is claimed are defined as follows:

1. A filter of the character described comprising:
   a pair of internested frustoconically shaped imperforate walls defining a frustoconical flow path therebetween;
   means for connecting the filter in a flow circuit for alternatively circulating fluid to be filtered in one direction in said flow path and flushing fluid in an opposite direction through said flow path;
   filtering means in said flow path between said walls operative to trap solid material from the fluid while circulating in said one direction and operative to release the trapped material to the flushing fluid;
   and means operative to move said walls relatively telescopically into close adjacency to compel fluid to be filtered to flow through said filtering means and also operative to move said walls separatingly to effect a substantial gap therebetween to facilitate cleaning of the filtering means during flushing fluid flow through said path.

2. A filter as defined in claim 1, in which said means for moving said walls comprises an annular diaphragm connecting said walls and responsive to fluid pressure differentials to effect said respective movements of said walls.

3. A filter as defined in claim 1, in which the inner of said walls comprises a substantially cup-shaped member having a closed end and an open end, the outer of said walls comprises a housing of substantial cup-shape having a narrowed end and an open end, said means for connecting said flow path into a flow system comprises a nozzle in communication with the narrowed end of said housing and another nozzle opening into the housing adjacent the open end, and said means operative to move said walls comprises an annular diaphragm connecting the open end of said inner member and the open end of said housing.

4. A filter as defined in claim 3, including a bracket on the outer side of and projecting from said housing member and adapted to be secured to a mounting structure.

5. A filter as defined in claim 1, in which said wall members are generally convergently related toward their wider ends.

6. A filter as defined in claim 5, in which said means operative to move said members comprises a diaphragm connecting said wider ends and responsive to fluid pressure differentials to effect said movements of said members.

7. A filter as defined in claim 1, in which said walls comprise respective molded plastic shells of generally cup-shape, the inner of said shells having integrally molded therewith on its widest end an annular diaphragm flange comprising said means operative to move said walls and sealingly attached to the widest end of the outer of said shells.

8. A filter as defined in claim 7, in which said widest end of the outer shell has a lateral annular flange terminating in an axially extending annular attachment flange, and said diaphragm has an axial annular terminal flange telescopically engaged and sealed to said attachment flange.

9. A filter according to claim 1, in which said filtering means comprises a plurality of filter teeth on one of said walls projecting generally toward the other of said walls in said flow path and in the direction of flushing fluid flow.

10. A filter of the character described comprising:
    a pair of internested frustoconically shaped walls defining a flow path therebetween;
    filtering means in said flow path between said walls comprising a plurality of annular rows of teeth on the inner of said walls successively increasing in number from the smaller diameter end to the larger diameter end of said inner wall;
    means for connecting the filter in a flow circuit for alternatively circulating fluid to be filtered and flushing fluid through said flow path;
    and means operative to move said walls relatively telescopically into close adjacency to compel fluid to be filtered through said filtering means and also operative to move said walls separatingly to effect a substantial gap therebetween to facilitate cleaning of the filtering means during flushing fluid flow through said path.

11. A filter as defined in claim 10, in which said teeth are of generally triangular form in side elevation and have tips which project in the direction of said smaller diameter end.

12. A filter as defined in claim 10, in which said inner wall includes alternating annular generally cylindrical areas and tapered annular areas, said teeth being on said tapered areas and aligned with said cylindrical areas.

13. A filter as defined in claim 10, in which said inner wall includes a plurality of integral stop fins to maintain said walls in predetermined close adjacency when fluid to be filtered is caused to flow through the said filtering means.

14. A self-cleaning filter comprising,
    a cone-shaped housing member having a pair of openings adapted to be connected in a fluid flow circuit,
    a cone-shaped wall member nested within said housing member,
        a plurality of teeth projecting from the wall of said wall member and extending toward and spaced from said housing member,
    a flexible member interconnecting said housing member and said wall member and adapted to permit said wall member to closely nest within said housing member when fluid is circulated through said openings in a first direction whereby said teeth and said wall member cooperate to form fluid flow passages to entrap foreign particles from said fluid, and said flexible member is further adapted to transport said wall member away from said housing member when the fluid is circulated through said openings in a second direction, whereby said fluid flow passages are eliminated for the release of said foreign particles to said fluid.

15. The filter as defined in claim 14, wherein said teeth are individually narrow and project axially in the same direction of fluid flow as said second direction.

16. The filter as defined in claim 14, wherein one of said members further comprises stop means to limit the amount of internesting of said wall member.

17. The filter as defined in claim 14, wherein said flexible member comprises a bellows section integrally associated with said wall member.

18. A filter for filtering foreign particles from a fluid stream flowing therethrough in a first direction and for releasing the foreign particles to a fluid stream flowing therethrough in a second direction opposite to said first direction, comprising:
    a pair of telescopically internested frustoconical imperforate wall members having spaced confronting wall surfaces defining a flow path therebetween;
    foreign particle trapping means in said flow path between said confronting wall surfaces; and a yieldable wall section interconnecting said pair of wall members, said yieldable wall section movable to move said wall members telescopically into close adjacency when the fluid in said flow path flows in said first direction for entrapping foreign particles from the fluid, and said yieldable wall section movable to move said wall members apart to effect a substantial gap therebetween when the fluid in said flow path flows in said second direction for releasing foreign particles to the fluid.

19. A filter for filtering foreign particles from a fluid stream flowing therethrough under negative pressure and for releasing the foreign particles to a fluid stream flowing therethrough under positive pressure, comprising:

a pair of internested wall member having spaced confronting surfaces defining a flow path therebetween, one of said surfaces having a plurality of filter teeth thereon projecting generally toward the other surface; and an extensible and retractable wall section interconnecting said pair of wall members said wall section retractable when the fluid in said flow path is under negative pressure to thereby minimize the spacing between said confronting surfaces for filtering foreign particles from the fluid and said wall section extensible when the fluid in said flow path is under positive pressure to thereby increase the spacing between said confronting surfaces for releasing the foreign particles to the fluid.

References Cited

UNITED STATES PATENTS

| | | | |
|---|---|---|---|
| 557,075 | 3/1896 | Langer | 210—455 X |
| 893,070 | 7/1908 | Gobbi | 210—356 X |
| 2,680,684 | 6/1954 | Obenshain. | |
| 3,179,116 | 4/1965 | Jacobs | 210—356 X |
| 3,217,884 | 11/1965 | Long | 210—108 |
| 3,282,427 | 11/1966 | Mandarino et al. | 210—108 |
| 3,322,282 | 5/1967 | Lyman | 210—137 |

REUBEN FRIEDMAN, *Primary Examiner.*

JOHN ADEE, *Assistant Examiner.*

U.S. Cl. X.R.

210—411